(12) United States Patent
Dutta

(10) Patent No.: US 8,064,668 B2
(45) Date of Patent: Nov. 22, 2011

(54) METHOD OF MODIFYING A SEGMENTED VOLUME

(75) Inventor: Sandeep Dutta, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 523 days.

(21) Appl. No.: 12/337,019

(22) Filed: Dec. 17, 2008

(65) Prior Publication Data

US 2010/0150419 A1    Jun. 17, 2010

(51) Int. Cl.
*G06K 9/34*    (2006.01)
*G06K 9/00*    (2006.01)

(52) U.S. Cl. .......................... 382/128; 382/131; 382/132

(58) Field of Classification Search ........................ None
See application file for complete search history.

(56) References Cited

U.S. PATENT DOCUMENTS

| 5,857,030 A * | 1/1999 | Gaborski et al. | 382/132 |
| 2004/0151374 A1 * | 8/2004 | Lipton et al. | 382/181 |
| 2006/0013454 A1 * | 1/2006 | Flewelling et al. | 382/128 |
| 2009/0041322 A1 * | 2/2009 | Wolf | 382/131 |

* cited by examiner

*Primary Examiner* — Vinh Nguyen

(57) ABSTRACT

A method of modifying a segmented volume is disclosed herein. The method includes generating a reduced-resolution segmentation mask including a segmented region. The method includes performing a morphological erosion on the segmented region to form an eroded region and performing a morphological dilation on the eroded region to form a dilated region. The method also included identifying a leakage region in the segmented volume based on the dilated region and removing the leakage region from the segmented region to form an updated segmented volume.

6 Claims, 2 Drawing Sheets

US 8,064,668 B2

METHOD OF MODIFYING A SEGMENTED VOLUME

FIELD OF THE INVENTION

This disclosure relates to image processing and more specifically to a method of modifying a segmented volume.

BACKGROUND OF THE INVENTION

The identification of contiguous regions of a structure or organ in data from a diagnostic imaging system is known as segmentation. The automatic segmentation of structures is a technically difficult issue that has become even more problematic with the introduction of higher resolution diagnostic imaging systems.

Segmentation algorithms typically involve attempting to segregate a specific structure of a patient's anatomy based on a parameter such as a Hounsfield number for an image acquired with a computed tomography system or a proton density for an image acquired with a magnetic resonance imaging system. Using an image acquired with a computed tomography system as an example, a segmentation algorithm will typically identify areas to be segmented by Hounsfield number and then perform a connected component analysis in order to group these areas into a segmented volume. However, as diagnostic imaging systems have increased in resolution, the resulting image data often contain an increased level of noise. Since traditional segmentation algorithms cannot discriminate between accurate data and data that are corrupted by noise, the segmentation algorithm may introduce some regions of corruption when generating a segmentation mask. The regions of corruption typically show up as diffused spatial regions, or leakage regions, within the segmentation mask The issue of accurately segmenting a specific structure of the patient is particularly problematic when the structure includes a narrow passageway with a low signal such as an airway within the patient's lungs or a vessel. Because modern diagnostic imaging systems provide higher resolution data, it is possible to segment small-diameter airways and vessels. However, when the segmentation algorithm is applied to the data, it is quite common that the segmentation algorithm will erroneously include areas outside of the airway or vessel in the segmented volume.

For these and other reasons, there is a need for a method to improve the segmented volume from three-dimensional diagnostic imaging data.

BRIEF DESCRIPTION OF THE INVENTION

The above-mentioned shortcomings, disadvantages and problems are addressed herein which will be understood by reading and understanding the following specification.

In an embodiment, a method of modifying a segmented volume includes generating a reduced-resolution segmentation mask including a segmented region. The method includes performing a morphological erosion on the segmented region to form an eroded region. The method includes performing a morphological dilation on the eroded region to form a dilated region. The method includes identifying a leakage region in the segmented volume based on the dilated region and removing the leakage region from the segmented volume to form an updated segmented volume.

In an embodiment, a method of modifying a segmented volume includes compressing a segmentation mask by a factor to form a reduced-resolution segmentation mask. The method includes performing a morphological erosion on a segmented region in the reduced-resolution segmentation mask to form an eroded region. The method includes performing a morphological dilation on the eroded region to form a dilated region. The method includes expanding the dilated region to form an expanded region. The method also includes removing the expanded region from the segmented volume to form an updated segmented volume.

In an embodiment, a method of modifying a segmented volume includes identifying a slice in a segmentation mask. The method includes generating a reduced-resolution segmentation mask of the slice, the reduced-resolution segmentation mask including a segmented region. The method includes performing a morphological erosion on the segmented region to form an eroded region. The method includes performing a morphological dilation on the eroded region to form a dilated region. The method also includes identifying a leakage region in the segmented volume based on the dilated region and removing the leakage region from the segmented volume.

Various other features, objects, and advantages of the invention will be made apparent to those skilled in the art from the accompanying drawings and detailed description thereof.

DETAILED DESCRIPTION OF THE INVENTION

In the following detailed description, reference is made to the accompanying drawings that form a part hereof, and in which is shown by way of illustration specific embodiments that may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken as limiting the scope of the invention.

Figure 1:
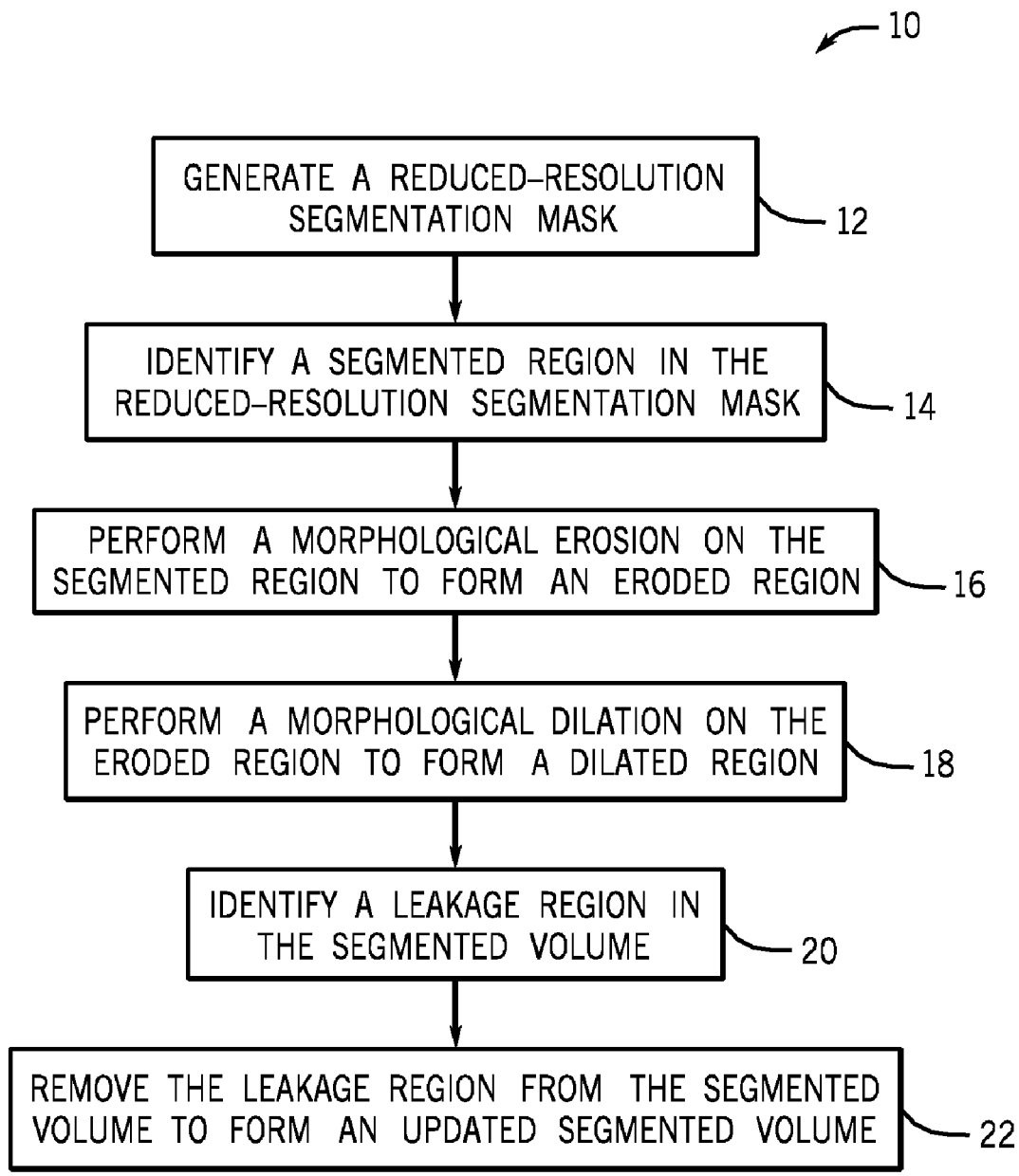
FIG. 1 is a flow chart illustrating a method in accordance with an embodiment.

FIG. 1 is a flow chart illustrating a method 10 in accordance with an embodiment. The individual blocks 12-22 represent steps that may be performed in accordance with the method 10. The technical effect of the method 10 is the formation of an updated segmented volume.

Referring to FIG. 1, as an input to the method 10, data is acquired with a diagnostic imaging system. According to an embodiment, the diagnostic imaging system may be a computed tomography system. A segmentation algorithm is applied to the data and results in the identification of a segmented volume as is well-known by those skilled in the art. It should be understood that the data may be acquired with other types of diagnostic imaging systems as well. A non-limiting list of diagnostic imaging systems that may be used to acquire data includes an x-ray system, a magnetic resonance imaging system, a PET system, a nuclear medicine system, and an ultrasound system.

The application of the segmentation algorithm to the data may result in the creation of a segmentation mask. According to this disclosure, the term segmentation mask is defined to include an output that identifies a portion of the data as belonging to a segmented region or a segmented volume. For example, if the segmentation algorithm is designed to segment an airway tree from the data, the segmentation mask may identify whether or not an image element belongs to the airway tree. For the purposes of this disclosure, the term image element includes a subcomponent of a segmentation mask. According to an embodiment, each image element in the segmentation mask may correspond to a pixel or a voxel in an image.

According to an embodiment, a segmentation mask may turn "on" a first group of voxels that are part of the segmented volume and turn "off" a second group of voxels that are not part of the segmented volume. When the segmentation mask is applied to an image, an embodiment may display only the voxels that are part of the segmented volume as defined by the segmentation algorithm. It should be appreciated that the implementation of the segmentation mask may be handled differently according to additional embodiments.

Once a segmentation mask has been created, an algorithm may be used to identify a slice in the segmentation mask that is likely to have a leakage region. For the purposes of this disclosure, the leakage region is defined to include a region that was erroneously included in the segmented volume. The leakage region may be a result of noise from the imaging system, an artifact, or other causes. According to an embodiment, the algorithm determines a number of active image elements in each slice of the segmentation mask. For the purposes of this disclosure, the term active image element is defined to include an image element that is a part of the segmented volume. The algorithm may then determine an average number of active image elements per slice for a group of slices in the segmentation mask. Then, the algorithm may calculate a ratio of the number of active image elements in the slice to the average number of active image elements per slice. If the ratio is found to be outside of a threshold, the slice may be likely to contain a leakage region. Experimentation performed with computed tomography data has shown that if a slice has more than 2000 active image elements and if the ratio exceeds 2.5, the slice is likely to contain a leakage region. It should be understood that the threshold for determining if a slice is likely to contain a leakage region may be an adjustable parameter. According to an embodiment, the threshold may be selected based on the type of data acquired by the diagnostic imaging system or based on the results of additional experimentation.

Figure 2:
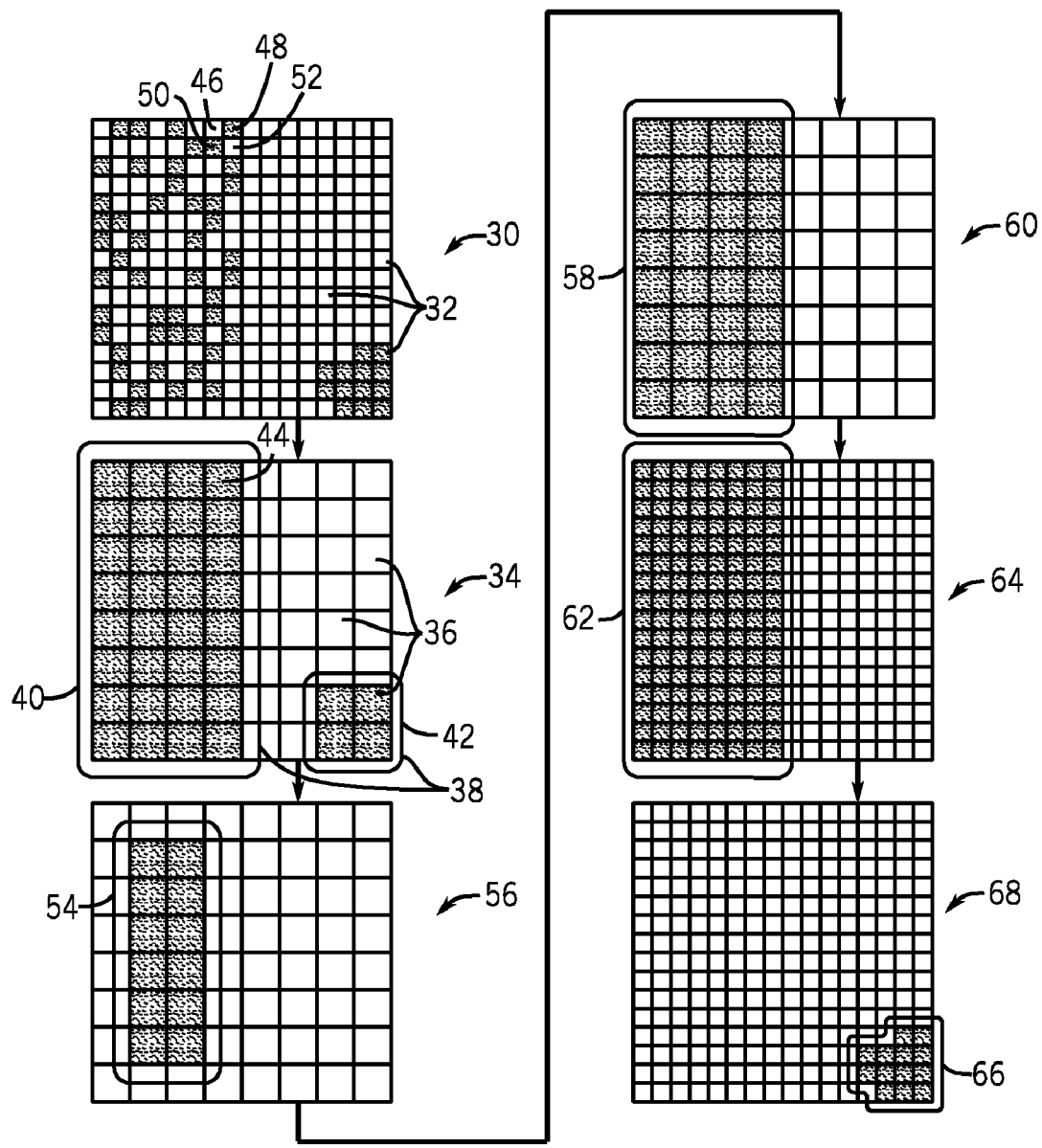
FIG. 2 is a schematic representation of a segmentation mask that is processed in accordance with an embodiment.

FIG. 2 is a schematic representation of a segmentation mask that is processed in accordance with an embodiment.

Referring to FIG. 2, a schematic representation of a segmentation mask 30 is processed in accordance with an embodiment. The segmentation mask 30 includes a plurality of image elements 32. In the embodiment depicted in FIG. 2, the plurality of image elements 32 are arranged in a 16×16 array. Each of the plurality of image elements 32 corresponds to a voxel or pixel reconstructed from data acquired with a diagnostic imaging system. Some of the plurality of image elements 32 are grey, while others of the plurality of image elements 32 are white according to an embodiment. Each of the grey image elements in the segmentation mask 30 represents an active image element while each of the white image elements represents an inactive image element. Collectively, all of the active image elements represent a segmented volume that was identified according to a segmentation algorithm.

Referring to both FIG. 1 and FIG. 2, at step 12, the method 10 generates a reduced-resolution segmentation mask 34 from the segmentation mask 30. The reduced-resolution segmentation mask 34 comprises a plurality of cells 36. Each of the plurality of cells 36 represents a plurality of image elements 32 from the segmentation mask 30. In the embodiment represented in FIG. 2, each of the plurality of cells 36 in the reduced-resolution segmentation mask 34 represents 4 image elements from the segmentation mask 30.

According to the reduced-resolution segmentation mask 34, each cell 36 represents a 2×2 array of image elements 32 from the segmentation mask 30. Therefore, the reduced-resolution segmentation mask 34 has been reduced by a factor of 4 compared to the segmentation mask 30. According to additional embodiments, the factor could be any number greater than 2. According to an embodiment, the number of image elements represented by each cell 36 may be an adjustable parameter. It was experimentally found that having each cell 36 in the reduced-resolution segmentation mask 34 represent either a 16×16 array of image elements 32 or a 32×32 array of image elements 32 provided beneficial results based on data that were collected with a computed tomography system.

Referring to FIG. 1 and FIG. 2, at step 14 a segmented region 38 is identified in the reduced-resolution segmentation mask 34 in accordance with an embodiment. The segmented region 38 comprises a larger region 40 and a smaller region 42. According to an embodiment, if any of the image elements 32 represented by a cell are included in the segmented volume, then the cell is included in the segmented region 38. For example, a cell 44 in the reduced-resolution segmentation mask 34 represents an image element 46, an image element 48, an image element 50, and an image element 52. Since the image element 48 and the image element 50 are both included in the segmented volume, the cell 44 is included in the segmented region 38 of the reduced-resolution segmentation mask 34. The cells 36 that are included in the segmented region are shown in grey in the reduced-resolution segmentation mask 34. If none of the image elements 32 represented by a cell are included in the segmented volume, then the cell is not included in the segmented region 38 in the reduced-resolution segmentation mask 34. According to an embodiment, a connected-component analysis may be applied to the cells that are part of the segmented region 38 in the reduced-resolution segmentation mask 34.

At step 16, a morphological erosion is performed on the segmented region 38 to form an eroded region 54 as shown in an eroded mask 56. The morphological erosion is a well-known image processing technique and it comprises removing one or more of the outermost layer of cells from the segmented region 38. The morphological erosion results in the creation of the eroded region 54 that is smaller in size than the segmented region 38. The segmented region shown in the reduced-resolution segmentation mask 34 comprises a larger portion 40 and a smaller portion 42. After the morphological erosion, the larger portion 40 is reduced in size to form the eroded region 54, and the smaller portion 42 is eliminated. The exact parameters of the morphological erosion may be adjusted on a case-by-case basis. According to an embodiment, the parameters of the erosion may be based on the specifics of the data and the anatomy under examination.

At step 18, a morphological dilation is performed on the eroded region 54 to form a dilated region 58 as shown in a dilated mask 60. The morphological dilation is another well-known image processing technique that is the inverse of the morphological erosion. The morphological dilation includes growing the size of the eroded region 54 by 1 or more cells in all directions. The exact parameters of the morphological dilation may be adjusted based on the specifics of the data and the anatomy under examination. According to the embodiment represented in FIG. 2, the smaller region 42 disappears during the morphological erosion of step 16. The significance of this step will be addressed hereinafter.

According to an exemplary embodiment, the goal may be to accurately segment a structure such as an airway tree or a vessel tree. It is technically difficult to accurately segment both small airways and small vessels. At small diameters, such as 3 mm and smaller, both vessels and airways exhibit relatively small concentrated areas of signal. By comparison, leakage regions tend to be more diffuse and less homogeneous. A leakage region in a segmentation mask will tend to have a granular look to it due to the distribution of the active image elements and the inactive image elements.

However, by creating a reduced-resolution segmentation mask and performing a morphological erosion, it is possible to separate the structure that is targeted by the segmentation from the leakage region. According to an exemplary embodiment, an airway is targeted by the segmentation algorithm. By creating the reduced-resolution segmentation mask 34 and performing a morphological erosion, the method 10 separates the relatively diffuse leakage region from the airway which is much smaller and more concentrated. By separating the leakage region from the airway or vessel, it is then possible to update the segmentation mask 30 so that the leakage region is no longer included in the segmented volume.

Still referring to FIG. 1 and FIG. 2, at step 20, a leakage region is identified in the segmented volume. According to an embodiment, the leakage region is identified by expanding the dilated region 58 by a factor to form an expanded region 62 as shown in an expanded mask 64. The dilated region 58 may be expanded by the same factor that was used while generating the reduced-resolution segmentation mask 34 during step 12. According to the embodiment represented in FIG. 2, the dilated region 60 is expanded by a factor of 4. The expanded region 62 may be the same resolution as the segmentation mask 30. According to an embodiment, the expanded region 62 represents the leakage region.

At step 22, the leakage region represented by the expanded region 62 is removed from the segmented volume to form an updated segmented volume 66 and an updated segmentation mask 68. By removing the leakage region from the segmented volume, the updated segmentation mask 68 more accurately represents the anatomical region being targeted by the segmentation algorithm. According to an embodiment, the updated segmentation mask may be applied to the data acquired by the diagnostic imaging system and all or a portion of the updated segmented volume may be displayed on a display device such as a monitor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A method of modifying a segmented volume comprising:
    generating a reduced-resolution segmentation mask comprising a segmented region;
    performing a morphological erosion on the segmented region to form an eroded region;
    performing a morphological dilation on the eroded region to form a dilated region;
    identifying a leakage region in the segmented volume based on the dilated region; and
    removing the leakage region from the segmented volume to form an updated segmented volume.

2. The method of claim 1, wherein said generating the reduced-resolution segmentation mask comprises representing a plurality of image elements from a segmentation mask as a cell in the reduced-resolution segmentation mask.

3. The method of claim 2, wherein said generating the reduced-resolution segmentation mask further comprises assigning the cell a first status if any of the plurality of image elements are part of the segmented volume.

4. The method of claim 3, wherein said generating the reduced-resolution segmentation mask further comprises assigning the cell a second status if none of the plurality of image elements are part of the segmented volume.

5. The method of claim 1, wherein said identifying the leakage region comprises expanding the dilated region to a resolution that is the same as the segmented volume.

6. The method of claim 1, wherein the segmented volume comprises data that was acquired with a diagnostic imaging system.

* * * * *